3,197,520
PROCESS FOR THE ARYLATION OF
AROMATIC COMPOUNDS
Ernest Bryson McCall, Llangollen, and Ryland James
Roberts, Glynceiriog, near Wrexham, Wales, assignors to Monsanto Chemicals Limited, London, England, a British company
No Drawing. Filed Nov. 30, 1961, Ser. No. 156,145
Claims priority, application Great Britain, Dec. 30, 1960, 42,839/60
8 Claims. (Cl. 260—670)

This invention relates to a new process by which an aromatic compound can be arylated.

By arylation of a compound is meant the introduction of an aromatic group, that is to say the group remaining on removal of a hydrogen atom from a nuclear carbon atom of a cyclic system that is stabilized by the presence of non-localized $\pi$-electrons, for instance a phenyl group or a pyridyl group, with the formation of a bond between the aromatic group and a carbon atom of the organic compound. A typical arylation is, for instance, the introduction of a phenyl group into diphenyl to produce a terphenyl.

The introduction of an aromatic group such as, for instance, a phenyl group does, in principle, constitute an important reaction, and the formation of a terphenyl referred to above is of course only one example of the type of compound that can be produced. The terphenyls and other related compounds are themselves valuable products, by virtue of the fact that they are stable liquids at elevated temperatures. The terphenyls are of particular significance in that they are also materials which are stable to the effects of atomic radication and which possess good neutron-moderating properties. They can accordingly be employed as functional fluids, for instance as moderator-coolants, in nuclear reactors.

The arylation reaction that has now been discovered provides a useful new route to many aromatic compounds.

The process of the invention is one for the arylation of an aromatic compound, in which said compound is reacted at an elevated temperature with an aromatic sulphone in the presence of a strong alkali.

The aromatic compounds that can be arylated are compounds that possess a cyclic system that is stabilized by the presence of non-localized $\pi$-electrons, for instance benzene, diphenyl, naphthalene, benzofuran, thiophene or pyridine.

The elevated temperature is generally a temperature higher than 200° C., and preferably above 250° C. Good results are obtained using a reaction temperature in the range of 300° to 400° C. or even higher, for instance a temperature of 350° or 375° C. In practice the requirement as to reaction temperature means that the process is particularly convenient for the arylation of organic compounds that are relatively high boiling, for example diphenyl. In the instance of more volatile compounds, however, a sufficiently high reaction temperature can often be obtained by carrying out the process under an elevated pressure. In general the reaction temperature is preferably such that the reaction mixture is molten.

The aromatic compounds that can be arylated include the carbocyclic compounds such as benzene and condensed benzenoid systems such as for instance naphthalene, and aromatic compounds having a heterocyclic ring such as for instance furan, thiophene and pyridine. More than one ring or type of ring can be present in the compound, for instance the compound can be a diphenyl, diphenyl ether, benzothiophene or dibenzothiophene, and, where this is so, arylation can take place in all or any of the rings. In general the aromatic compound can contain a substituent, particularly a hydrocarbon substituent, for example an aliphatic group for instance an alkyl or cycloalkyl group, such as a methyl, ethyl, octyl or cyclohexyl group. Specific examples of aromatic compounds including substituted ones are: toluene, the xylenes, ethylbenzene, dodecylbenzene, diphenyl, diphenyl ether, o-, m- and p-terphenyl, the quaterphenyls 2-methyldiphenyl, 4-isopropyldiphenyl, 4,4'-di-isopropyldiphenyl, 1-methylnaphthalene, 1,6-dimethylnaphthalene, indene, anthracene, 3-ethylanthracene, 2-ethylthiophene, 2-phenylthiophene, benzofuran, 4-methylbenzofuran, 4-phenylbenzofuran, dibenzofuran, 1-cyclohexyldibenzofuran, 1-phenyldibenzofuran, 1-cyclohexyldibenzothiophene, 2-phenyldibenzothiophene and quinoline.

The arylating agent, the aromatic sulphone, is a compound in which a carbon atom of an aromatic radical is linked through an —$SO_2$— group to a carbon atom of another organic group, preferably a second aromatic radical. In principle such aromatic radicals can be those derived from any of the aromatic compounds referred to above as capable of being arylated in the process of the invention.

In practice the aromatic sulfones which are particularly preferred are those containing the relatively simple aromatic radicals such as phenyl, tolyl, xylyl, ethylphenyl, diphenylyl and naphthyl.

However, the arylating agent can, in general, be one containing a carbocyclic aromatic radical such as a phenyl or a condensed benzenoid radical such as naphthyl, or an aromatic radical having a heterocyclic ring such as a furyl, thienyl or pyridyl radical. More than one type of ring can be present in the aromatic radical, for instance the radical can be a diphenylyl, benzothienyl, dibenzothienyl or quinolinyl radical. In general the radical can contain a substituent, for example an aliphatic group, for instance an alkyl or cycloalkyl group, such as a methyl, octyl, nonyl or cyclohexyl group.

As illustrative of specific sulfones wherein both of the free valences of the —$SO_2$— group contain aromatic radicals are diphenyl sulfone, p,p'-ditolyl sulfone, 2-diphenylyl phenyl sulfone, 2-dinaphthyl sulfone, 1-dinaphthyl sulfone, 2-naphthyl phenyl sulfone, 1-naphthyl phenyl sulfone, di-o-xylyl sulfone and the like. Sulfone wherein only one of said free valences contain an aromatic radical include phenyl methyl sulfone, phenyl ethyl sulfone, phenyl t-butyl sulfone, phenyl benzyl sulfone, phenyl isoamyl sulfone, phenyl phenylethyl sulfone, p-tolyl n-propyl sulfone and the like.

The strong alkali employed in the process of the invention is preferably an alkali metal hydroxide, such as sodium hydroxide or potassium hydroxide. Other strong alkali can however be used in suitable instances, for example alkali such as sodium or potassium carbonate, calcium oxide or hydroxide, and barium oxide or hydroxide. Preferably the alkali is one that permits the formation of a molten reaction mixture at the temperature employed. In general good results are obtained when the amount of alkali is approximately the molar equivalent of the quantity of sulphone employed.

Preferably an excess of the compound to be arylated is employed relative to the quantity of the aromatic sulphone. The excess can in some instances be quite small, but is preferably at least twice the molar equivalent and can, for example, be within a range of 5 to 25 times the molar equivalent, for instance 10 to 20 times.

The reaction time will depend on the reaction temperature and other factors, but a time of between 2 hours and 12 hours is often satisfactory, for instance a reaction time of about 4 to 8 hours.

The product of the process of the invention is often a mixture of isomers; appropriate arylation of diphenyl for example gives a mixture of o-, m- and p-terphenyl. In many instances, such as for use as a functional fluid, it is not essential that such isomers should be separated from each other, but simply that, for example, they should be isolated as a mixture from unchanged starting materials. If necessary, however, it is normally practical to separate a mixture of isomers, for example by fractional crystallization or by chromatography.

The process of the invention is illustrated by the following example.

*Example*

This example describes the preparation of a mixture of terphenyls (a mixture of the o-, m- and p-isomers) from diphenyl, diphenyl sulphone and sodium hydroxide.

A mixture of 350 grams (2.28 mol.) of diphenyl, 15.2 grams (0.07 mol.) of diphenyl sulphone and 3.1 grams (0.08 mol.) of sodium hydroxide was heated in an autoclave at 350° to 364° C. for 6 hours. After cooling, the product was taken up in acetone and filtered from inorganic material. The solvent was evaporated from the filtrate and the residue was subjected to fractional distillation, when 320 grams of unchanged diphenyl were recovered, and 12.9 grams (80% yield on the diphenyl sulphone assuming that the sulphone molecule gave rise effectively to one phenyl group) of the mixed terphenyl isomers were obtained as a fraction having a boiling range of 140° to 190° C. at a pressure of 0.5 mm. of mercury.

Following the procedural details set forth in the example above, other and different arylations in accordance with this invention include:

| Compound to be arylated | Sulfone | Product |
| --- | --- | --- |
| Dibenzothiophene | Phenyl methyl | Phenyl dibenzothiophene. |
| Benzene | Diphenyl | Diphenyl. |
| Naphthalene | do | Phenyl naphthalene. |
| 2-methyl-2-phenyloctane | do | Methyl-p-diphenyloctane. |
| Diphenyl | Di-p-tolyl | p-Tolyldiphenyl. |
| Naphthalene | do | p-Tolylnaphthalene. |
| Do | Di-p-cumyl | p-Isopropylphenylnaphthalene. |
| Diphenyl | Di-t-butylphenyl | t-Butylterphenyl. |

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A process for replacing a hydrogen atom on a nuclear carbon atom of an aromatic compound with an aryl group, said aryl group being selected from the class consisting of phenyl, alkylphenyl, naphthyl and diphenylyl, and said aromatic compound being selected from the class consisting of:
    (a) benzene, naphthalene and diphenyl;
    (b) alkyl-benzene, -naphthalene and diphenyl;
    (c) terphenyl, quaterphenyl and diphenyl ether;
    (d) furan, thiophene and mono- and dibenzo-furan and thiophene; and
    (e) alkyl-, cycloalkyl- and phenyl-furan, thiophene, and mono- and dibenzo-furan and thiophene;
said process comprising heating, at a temperature of at least about 200° C., said aromatic compound with a sulfone of the formula, R—$SO_2$—R′, wherein R represents said aryl group and R′ represents a member selected from the class consisting of R, alkyl and phenylalkyl, said heating being carried out in the presence of a member selected from the class consisting of alkali metal hydroxide, alkali metal carbonate and alkali metal oxide.

2. A process as defined in claim 1 wherein the heating is at a temperature of from about 200° C. to about 400° C.

3. A process as defined in claim 1 wherein the alkali metal is selected from the class consisting of sodium and potassium.

4. A process as defined in claim 1 wherein said aryl group is selected from the class consisting of phenyl, tolyl, xylyl, ethylphenyl, diphenylyl and naphthyl.

5. A process as defined in claim 4 wherein R and R′ are the same.

6. A process which comprises heating a polyphenyl having from 2 to 4 phenyl groups with diphenyl sulfone in the presence of an alkali metal hydroxide, said heating being at a temperature of from about 200° C. to about 400° C.

7. A process as defined in claim 5 wherein the alkali metal is selected from the class consisting of sodium and potassium.

8. A process as defined in claim 6 wherein said polyphenyl is diphenyl.

References Cited by the Examiner

Eikhman et al.: Chem. Abstracts, vol 29, p. 2520 (1935).

Otto: Ber. Deut. Chem., vol. 19, pp. 2427–7 (1886).

WALTER A. MODANCE, *Primary Examiner.*

DUVAL T. McCUTCHEN, *Examiner.*